United States Patent

[11] 3,559,994

| [72] | Inventor | Henry A. Larsen<br>Manitowish Waters, Wis. |
|---|---|---|
| [21] | Appl. No. | 748,140 |
| [22] | Filed | June 5, 1968<br>Continuation-in-part of application Ser. No.<br>420,757, Dec. 23, 1964, now abandoned. |
| [45] | Patented | Feb. 2, 1971 |
| [73] | Assignee | Arrowmatic, Inc.<br>Manitowish Waters, Wis.<br>a corporation of Wisconsin |

[54] REMOTE CONTROL TARGET FOR A SHOOTING RANGE
3 Claims, 17 Drawing Figs.

[52] U.S. Cl. .................................................. 273/105.6,
46/244
[51] Int. Cl. .................................................. A63b 63/00
[50] Field of Search .......................................... 273/105.6,
105.2; 104/148, 151; 46/243LV, 243RMD

[56] References Cited
UNITED STATES PATENTS

| 2,566,607 | 9/1951 | Geiser ........................... | 273/105.6X |
| 2,586,958 | 2/1952 | Keller ........................... | 273/105.6 |
| 2,822,937 | 2/1958 | Fox ................................ | 104/151X |
| 3,014,725 | 12/1961 | Lewis ........................... | 273/105.6 |
| 3,218,461 | 11/1965 | Saunders et al. ............. | 273/105.6X |
| 3,231,280 | 1/1966 | Collins ........................... | 273/105.6X |

Primary Examiner—Richard C. Pinkham
Assistant Examiner—Marvin Siskind
Attorneys—John W. Michael, Gerrit D. Foster, Bayard H. Michael, Paul R. Puerner, Joseph A. Gemignani, Andrew O. Riteris and Spencer B. Michael ABSTRACT: A target apparatus for an archery range including a wheeled cart mounted on a track. The drive motor is energized and controlled by means of a cable connected between a takeup device mounted on the cart and one end of the range. Control circuitry is provided to selectively drive the cart between opposite ends of the range and to position the cart at preselected distances from the front of the range. Various safety devices are provided to automatically stop the cart at opposite ends of the range and to stop the cart and sound an alarm should a user step onto the range. Such devices include cam members which engage the cart and lift it up causing the front wheels to spin freely out of contact with the support surface. They also include an electrically energized warning device which is energized by a foot pad member positioned at the front of the range.

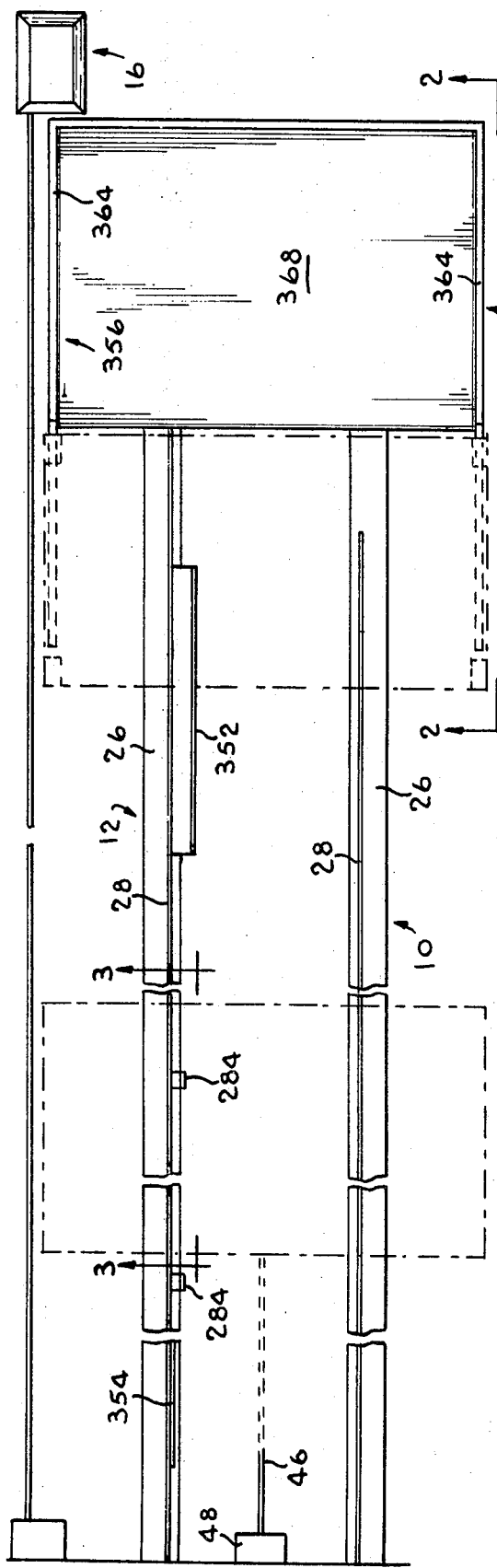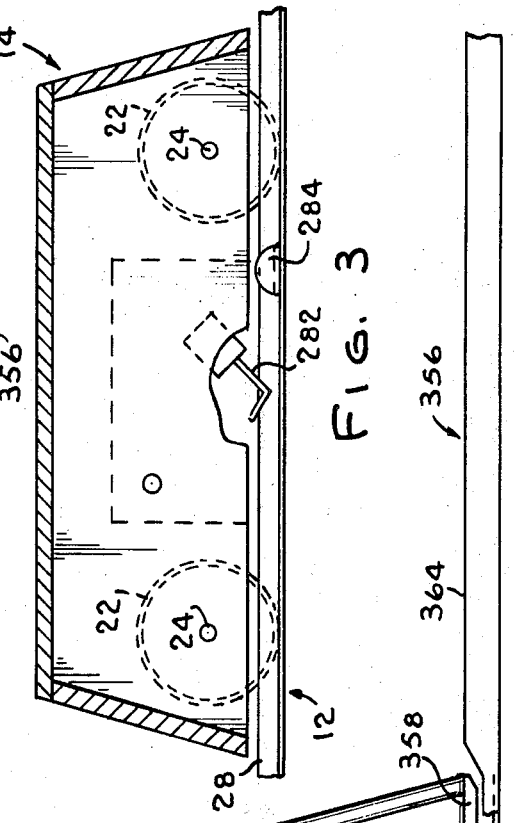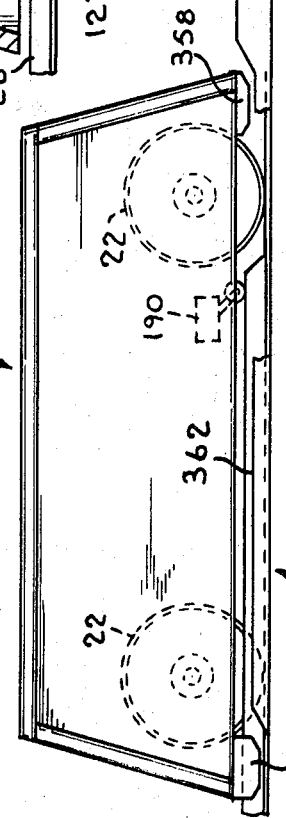
INVENTOR
HENRY A. LARSEN
BY Paul R. Puerner
ATTORNEY INVENTOR
HENRY A LARSEN
BY
Paul R. Puerner
ATTORNEY

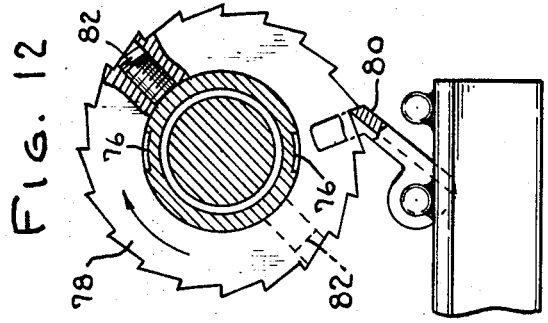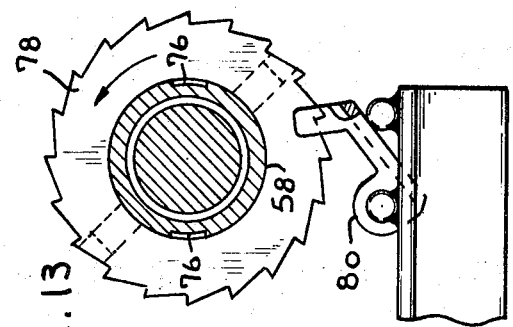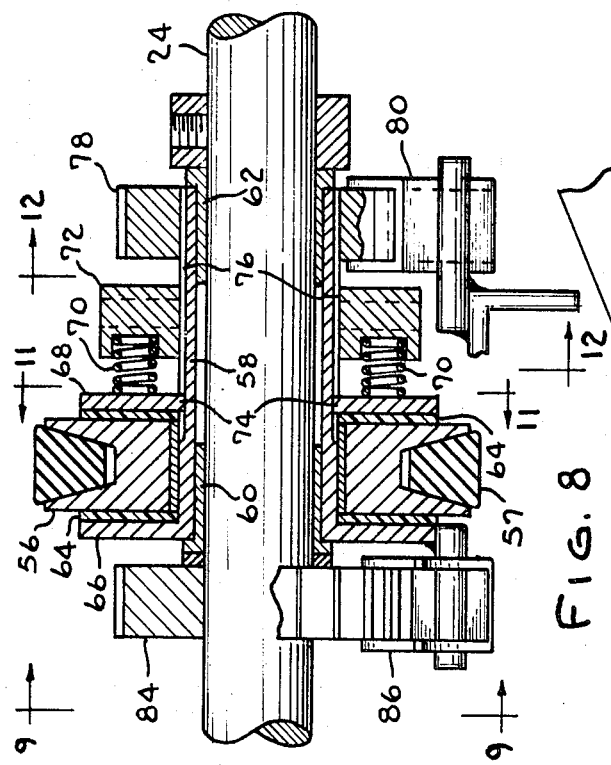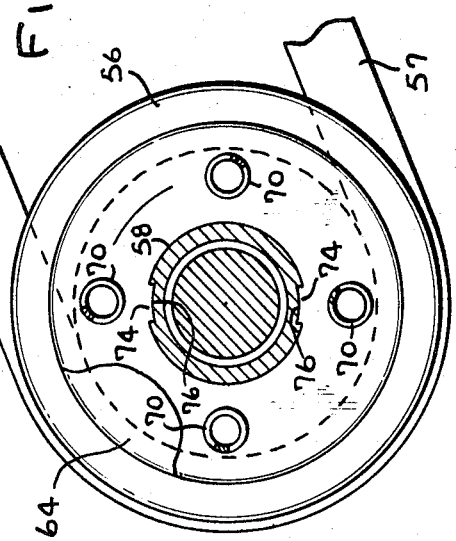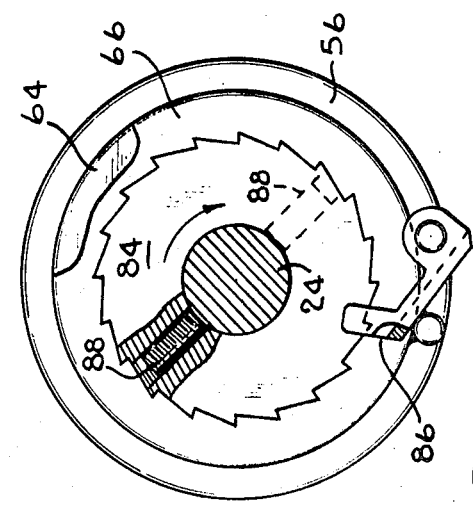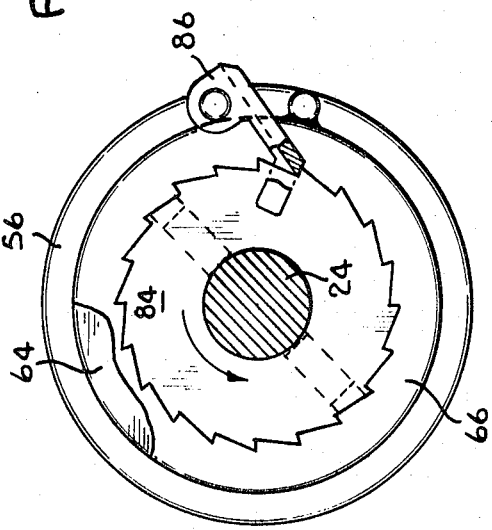

INVENTOR
HENRY A. LARSEN
BY Paul R. Puerner
ATTORNEY

2

REMOTE CONTROL TARGET FOR A SHOOTING RANGE

This application is a continuation-in-part of application Ser. No. 420,757 filed Dec. 23, 1964, now abandoned.

BACKGROUND OF THE INVENTION

1. Field of the Invention

This invention relates to improvements in remote control target devices and more particularly to a self-propelled, remotely controlled target carrier adapted for use in an archery range.

2. Description of the Prior Art

Prior archery target shooting arrangements have been of relatively complex construction and have failed to incorporate the several safety features present in the subject invention.

SUMMARY OF INVENTION

The target apparatus of this invention is comprised of a wheeled target cart mounted for rolling movement on a track. The cart is driven by a drive motor mounted on the cart which in turn in controlled by means of a control cable connected between a takeup device on the cart and one end of the range. A special stop switch means is provided to stop the cart at the front end of the range. It includes an elongated stop member adapted to alternately actuate a pair of spaced switches which are adapted to restore a circuit for starting the cart in the opposite direction only. A further safety arrangement to insure that the cart will be stopped at the front of the range is comprised of a pair of stationary cam member adapted for engagement by the cart causing the cart to be lifted off the ground.

A specially designed takeup device is provided which operates to maintain the control a cable under tension at all times even when the cart is stopped.

DESCRIPTION OF THE DRAWINGS

FIG. 1 is a fragmentary top plan view (with parts broken away) of an archery range embodying the present invention and showing the target carrying cart in two different positions as indicated by dotted lines:

FIG. 2 is a side elevation view taken along line 2–2 of FIG. 1;

FIG. 3 is a sectional view taken along line 3–3 for FIG. 1;

FIG. 8 is a fragmentary sectional view taken along line 8–8 of FIG. 4 through the cable takeup mechanism of this invention;

FIG. 9 is a sectional view taken along line 9–9 of FIG. 8 showing the parts in takeout position;

FIG. 10 is a view similar to FIG. 9 but showing the parts in the takeup position;

FIG. 11 is a sectional view taken along line 11–11 of FIG. 8;

FIG. 12 is a sectional view taken along line 12–12 of FIG. 8 showing the parts in takeout position;

FIG. 13 is a view similar to FIG. 12 but with the parts in the takeup position;

Referring now to the drawings in detail, FIG. 1 shows a plan view of one lane of the archery range. As shown, a pair of tracks 10,12 are mounted in each lane on which is driven a target carrying cart 14. The cart 14 is controlled from a control console 16 mounted adjacent the front end of the lane where the archers stand to shoot arrows at a target 18 (FIG. 7) mounted on cart 14. As will be explained, cart 14 can be positioned by remote control at a variety of positions along tracks 10,12 to provide the archer with shooting distances of varying lengths as desired. Also, as will be explained, the cart can be returned to the front of the lane after shooting is completed to permit removal of the arrows from the target. The cart is then returned to the desired shooting position for the next round of shooting.

As shown in FIGS. 2, 3 and 5, cart 14 is self-propelled and is comprised of a body portion 20 and four wheels 22 mounted on axles 24 for rolling engagement on tracks 10,12. As shown in FIG. 6, tracks 10, 12 are of the same basic construction and are comprised of a base portion 26 and an upstanding flange portion 28. The tracks are spaced so that the wheels 22 of the cart 14 will ride on base portions 26 immediately adjacent and on the outside of flange portions 28 which serve to guide the movement of the cart along the tracks. Tracks 10,12 can be readily installed on floors of concrete, wood, or other material thus obviating costly and permanent structural modifications to the building.

Figure 4:
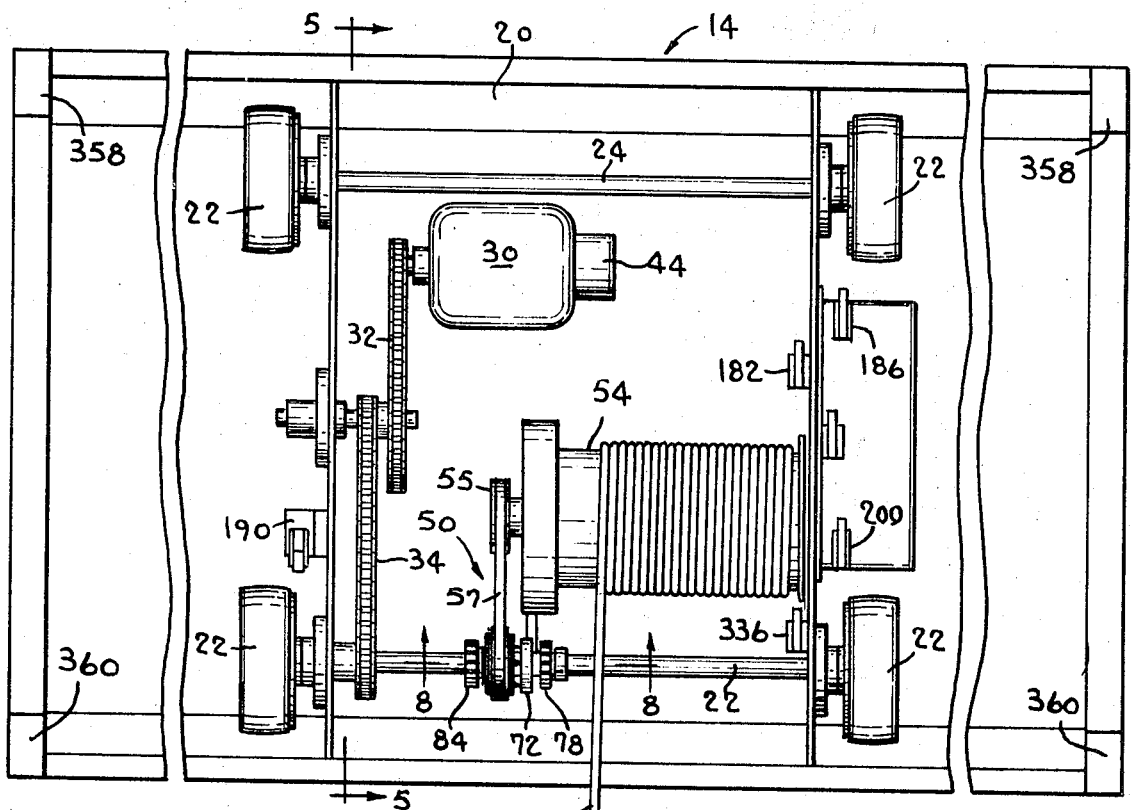
FIG. 4 is a bottom plan view (with parts broken away) of a target carrying cart constructed in accordance with this invention.
Figure 7:
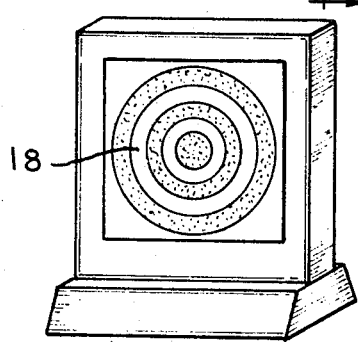
FIG. 7 is a perspective view of the target and target mount which is adapted to be carried by the cart.
Figure 5:
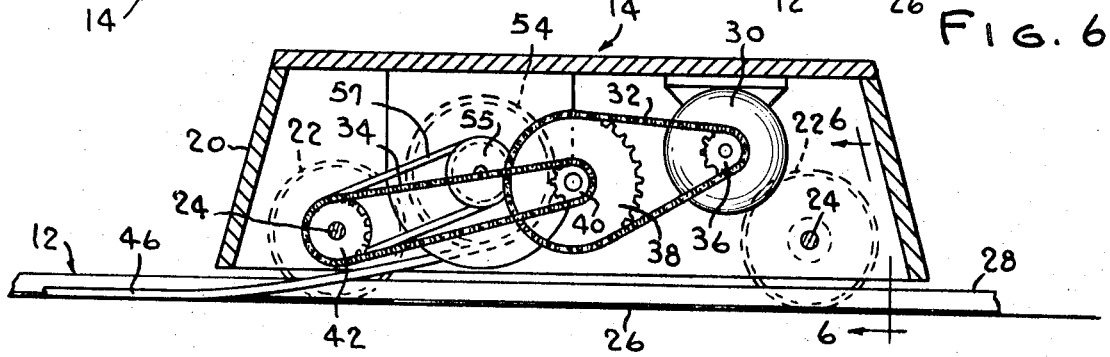
FIG. 5 is a sectional view taken along line 5–5 of FIG. 4.

The cart is powered by an electric motor 30 mounted beneath body member 20 and drivingly engaged with rear axle 24 by means of belts or chains 32,34 and sprocket gears 36, 38, 40 and 42, as shown in FIGS. 4 and 5. Motor 30 is provided with an electromagnetic brake 44, the operation of which will be explained hereinafter. Electric power to run motor 30 and control current for controlling the operation of the motor and brake are carried to cart 14 by means of a multiconductor cable 46 which extends from a back control panel 48 mounted at the rear end of the range (FIG. 1) to a takeup device 50 mounted on the cart beneath the cart body member 20.

Figure 6:
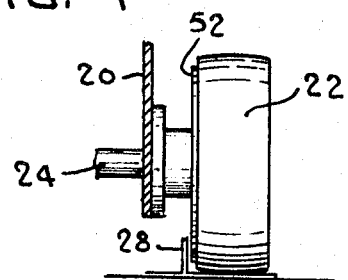
FIG. 6 is a fragmentary sectional view taken along line 6–6 of FIG. 5.

It should be noted at this point that the movement of cart 14 back and forth on tracks 10,12 will cause the inner surfaces of wheels 22 to rub against flange portions 28 of the tracks. It has been found that such rubbing poses a serious wear problem necessitating frequent replacement of the wheels. To solve this problem each wheel is provided with a wear pad 52 of highly wear-resistant material mounted between the wheel and the flange as shown in FIG. 6. Preferably, the pads 52 are in the form of a disc of nylon material and are mounted on the wheel axle immediately adjacent the inside surface of the wheel. The provision of such wear pads 52 protects the wheels from excessive wear on the sides thereof and can readily be replaced when required. Pads of nylon have displayed excellent wear characteristics when employed as described above and have required only infrequent replacement.

The detailed construction of takeup device 50 is shown in FIGS. 4 and 8–13. The device includes a takeup drum 54 on which cable 46 is wound when the cart moves toward the rear of the range and from which the cable is unwound when the cart moves toward the front of the range. The takeup drum is positively actuated in the windup direction and a drag is imposed thereon in the unwind direction by the operation of a specially designed drive and drag mechanism shown in FIGS. 8–13. Such mechanism is comprised of a clutch pulley 56 mounted on a flanged sleeve 58 which in turn is mounted on a pair of sleeve bearings 60,62. Pulley 56 is drivingly engaged with drum 54 by a pulley 55 on the drum and a belt 57 connected between pulleys 55 and 56. Pulley 56 is mounted between a pair of nylon clutch plates 64,64 retained in position by flange 66 of sleeve 58 and a pressure plate 68. Pressure plate 68 is biased toward pulley 56 to maintain the pulley in frictional engagement with clutch plates 64 by means of a plurality of springs 70 which are held under compression against the face of plate 68 by a retainer ring 72 fixed to sleeve 58 by setscrews or other suitable means. As shown in FIG. 11, pressure plate 68 is fixed to sleeve 58 by means of retainer ridges 74,74 on plate 68 adapted for engagement in grooves 76,76 in sleeve 58. It will be appreciated that the pressure exerted on pulley 56 by clutch plates 64,64 can be varied by adjusting the position of retainer ring 72 on sleeve 58.

Also mounted on sleeve 58 is a ratchet wheel 78 adapted for unidirectional engagement with a dog 80 pivotally mounted on the cart as shown in FIGS. 12 and 13. Ratchet wheel 78 is fixed to sleeve 58 by any suitable means such as setscrews 82. A second ratchet wheel 84 is mounted on axle 24 and is adapted for unidirectional engagement with a dog 86 pivotally mounted on flange portion 66 of sleeve 58, as shown in FIGS. 9 and 10. Ratchet wheel 84 is fixed to axle 24 by any suitable means such as setscrews 88,88 as shown.

The takeup apparatus operates as follows. Assume cart 14 is positioned at the front of the range and is driven from such position down-range to the desired shooting distance. As cart 14 moves down-range, rear axle 24 will be rotated in a counterclockwise direction when viewed as in FIGS. 10 and 13. As shown in FIG. 13, ratchet wheel 78 on sleeve 58 will be allowed to rotate freely by dog 80. As shown in FIG. 10, ratchet wheel 84 on axle 24 will engage dog 86 on sleeve 58 (flange 66) causing sleeve 58 to rotate with it. The rotational movement of sleeve 58 will be transmitted to pulley 56 by clutch plates 64,64, to thereby drive drum 54 in the takeup direction causing cable 46 to be wound up thereon. The size of pulleys 55 and 56 and the diameter of drum 54 are selected so that the rotational speed of axle 24 will be greater than the drum speed required to take up the slack in cable 46 as the cart moves down-range. This difference in speeds will be accommodated by slippage at clutch plates 64,64 which allows sleeve 58 (on axle 24) to rotate faster than pulley 56. Thus with rear axle 24 tending to overrun pulley 56 as the cable 46 is wound up on drum 54 any tendency for slack to develop in the cable will be eliminated.

After cart 14 stops at the desired shooting distance downrange from the console and its direction is reversed to return the cart, takeup device 50 operates as follows. With the cart moving up-range, rear axle 24 will rotate in a clockwise direction when viewed as shown in FIGS. 9 and 12. As shown in FIG. 9, ratchet wheel 84 on axle 24 will be allowed to rotate freely past dog 86. However, as shown in FIG. 12 ratchet wheel 78 will be engaged by dog 80 on the cart thereby preventing it from any movement whatsoever. Since ratchet wheel 78 is fixed to sleeve 58, such sleeve will also be held motionless. Thus with sleeve 58 held stationary a drag will be imparted to pulley 56 by clutch plates 64,64 as the up-range movement of the cart causes drum 54 to be rotated as cable 46 is unwound therefrom. The result is that cable 46 will be kept under a controlled tension at all times. As stated previously, the amount of such tension can be adjusted by adjusting the position of retainer ring 72 on sleeve 58.

Figure 16:
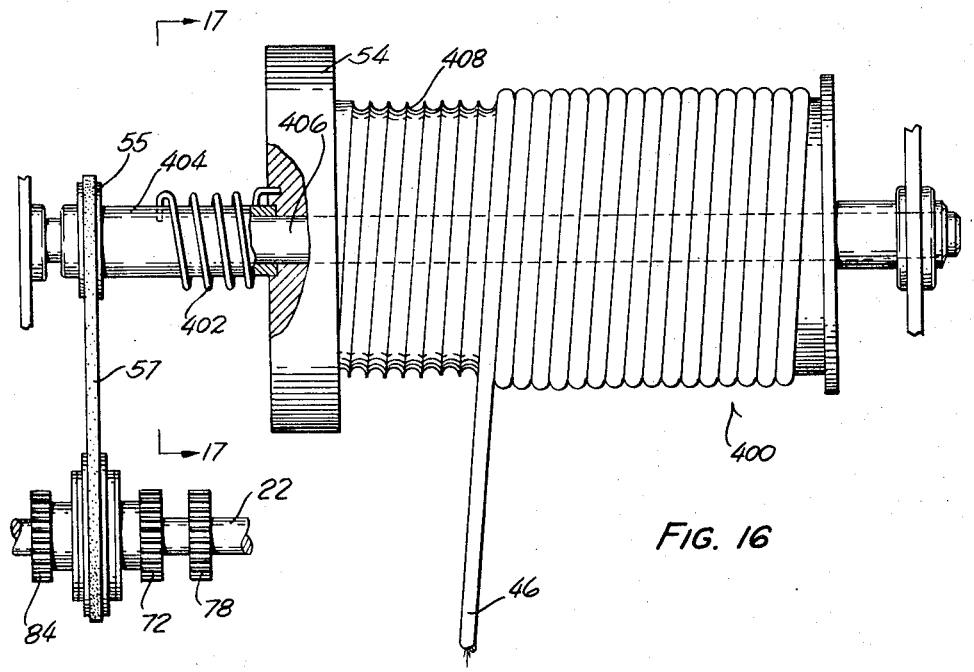
FIG. 16 is an enlarged fragmentary view showing a modified takeup device.
Figure 17:
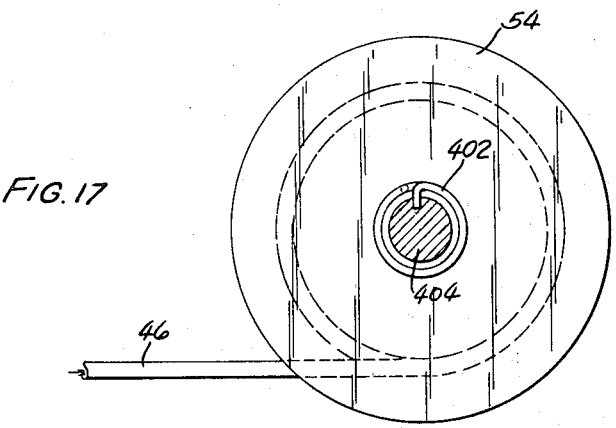
FIG. 17 is a view taken along line 17–17 of FIG. 16.

FIGS. 16 and 17 show a modified takeup device arrangement 400 specially designed to provide improved operating characteristics over the arrangement shown in FIG. 4. Experience has shown that when the target cart is moved to the front of the range for removal of arrows from the target, such removal will often cause the cart to be rolled back and forth slightly. Such movement will cause a slight rotation of the drum which in turn tend tends to create a slack condition in the cable which will often result in a misalignment of the cable on the drum. The modified arrangement of FIGS. 16 and 17 very effectively corrects this problem.

Most of parts of the modified takeup device 400 are the same as previously described takeup device 50 and have therefore been identified with the same reference numerals. The improvement resides in the provision of a suitable spring means located somewhere in the drive train between the drive motor 30 and the takeup drum 54. While this can be accomplished in different ways the preferred arrangement employs a coil spring member 402 fastened at one end to a drive hub 404 and at the other end to drum 54. Hub 404 and drum 54 are freely rotatably mounted on a shaft 406 and a driving connection between the hub and drum is provided by spring 402.

In operation when the cart is driven down-range, hub 404 will be driven in a counterclockwise direction by belt 57 as viewed in FIG. 17. The counterclockwise driving action of hub 404 will be transmitted to drum 54 by means of spring 402. The spring 402 in performing this function will be biased to an energy story position. Similarly when the cart is driven up-range for removal of arrows from the target, the energy storing position of spring 402 will be maintained as the drum is rotated in the opposite direction against the friction of clutch plates 64,64. Thus it is seen that the energy storing position of spring 402 will be maintained throughout the operation of the target apparatus with the spring in effect serving to keep cable 46 under constant tension even when the cart is stopped. Therefore, should the cart be moved slightly for any reason such as the removal of arrows from the target, the action of spring 402 will prevent the cable from becoming loose on the takeup drum to an extent wherein misalignment could occur. It will be noted in this regard, that as shown in FIG. 16 the surface of drum 54 is grooved as at 408 to accommodate cable 46 in a uniform manner. As indicated, the action of spring 402 effectively prevents misalignment of the cable with the grooves on the drum.

CONTROL SYSTEM AND OPERATION

Figure 14:
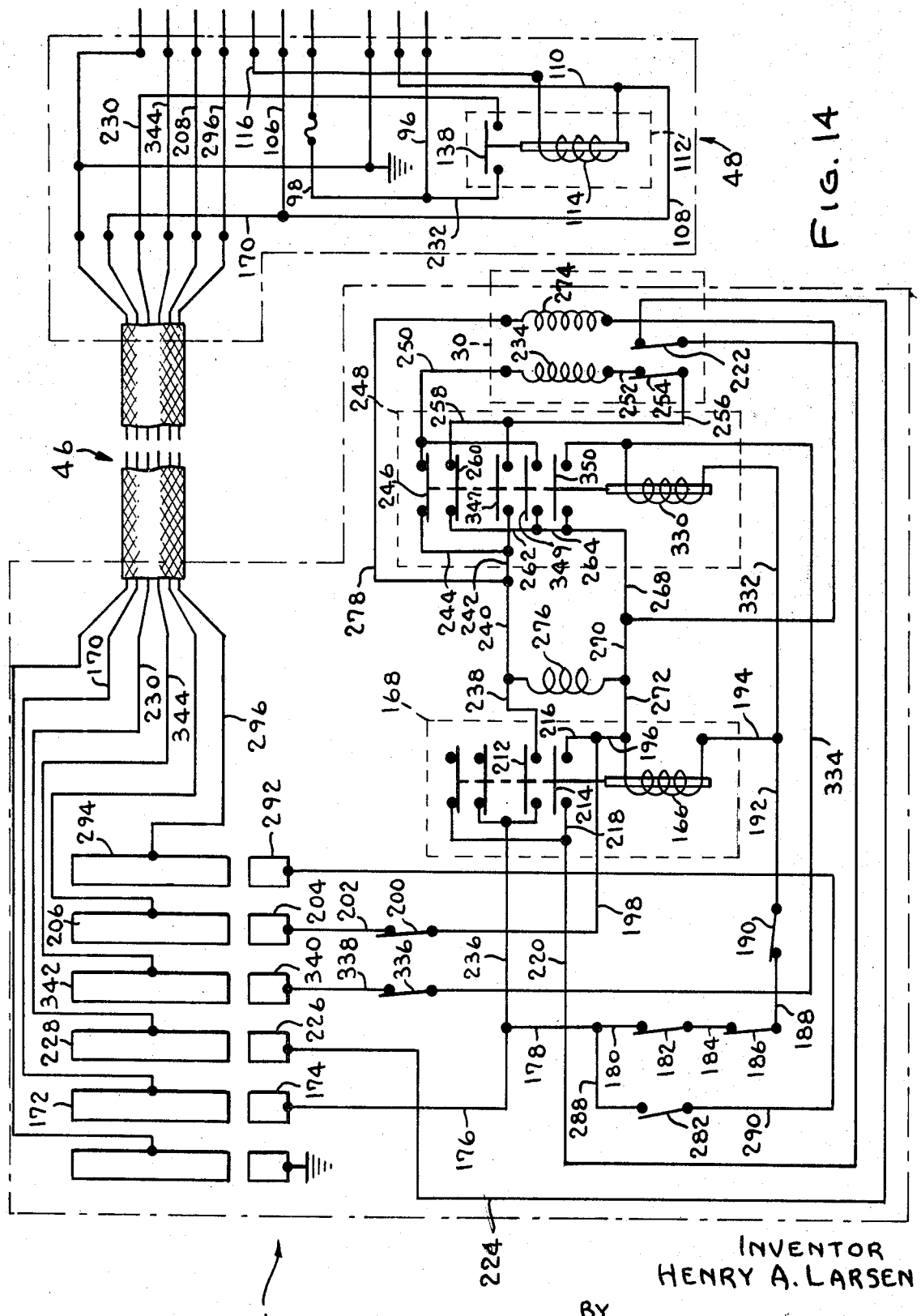
FIGS. 14 and 15 are partially schematic circuit diagrams which, when taken together, show the control circuitry for the archery target device of this invention.
Figure 15:
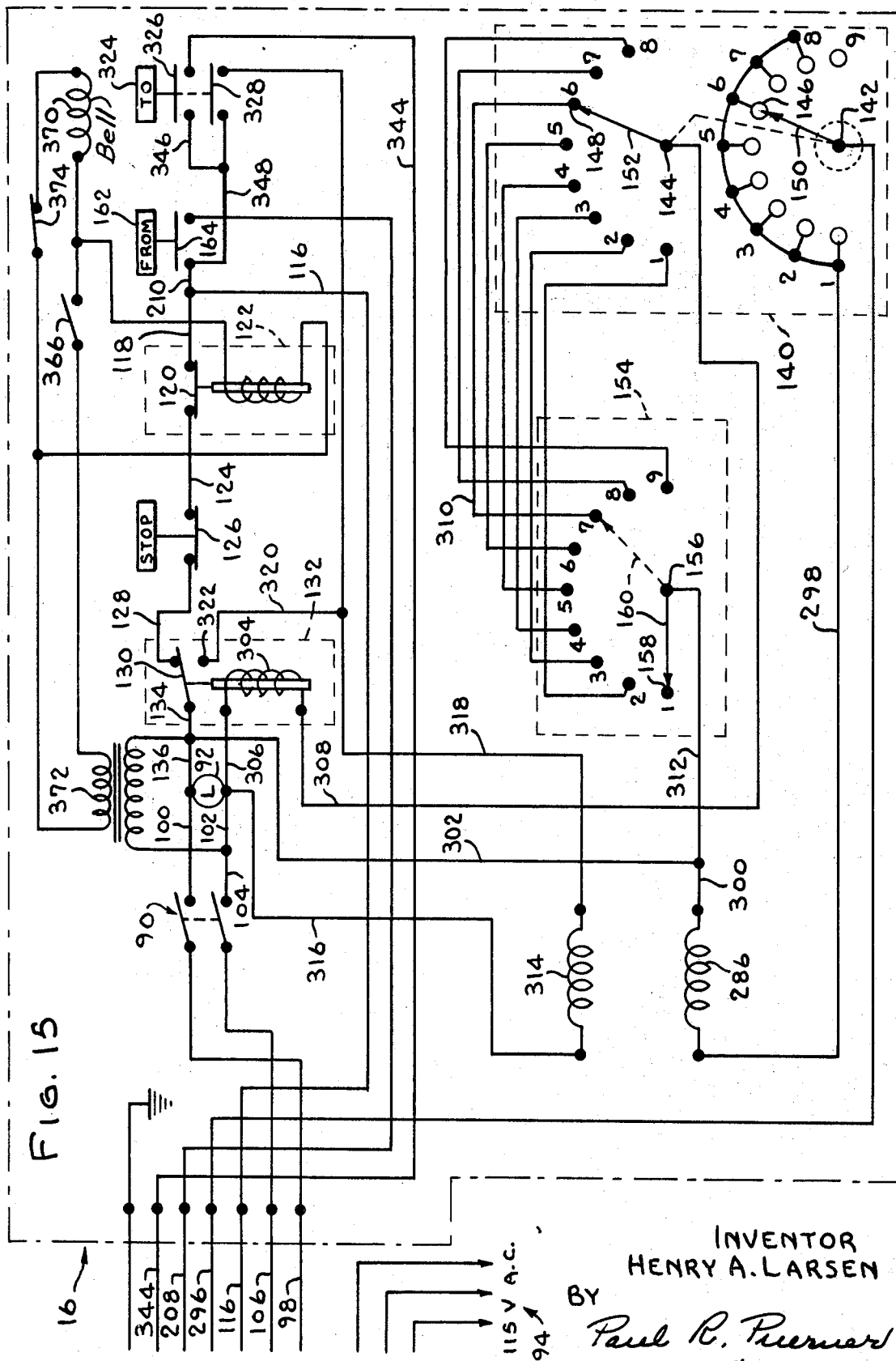

The control circuitry for operating cart 14 by remote control from console 16 is shown in FIGS. 14 and 15. For purposes of the explanation which follows, FIGS. 14 and 15 should be viewed together with FIG. 15 positioned to the right of FIG. 14. When thus viewed the portion of the control system located on the cart is shown on the left (FIG. 14) and is marked with the reference numeral 14. The portion of the system located at the back control panel is shown in the middle (FIG. 14) and is marked with the reference numeral 48 and the portion of the system located at the console is shown on the right (FIG. 14) and is marked with the reference numeral 16.

The control system can best be described by describing the operation of the invention as it would be used in a typical installation.

Assume cart 14 is positioned at the front of the range and that it is desired to move the cart down-range a given distance for shooting. Assume also that the desired shooting distances are arranged at 5-foot intervals with a minimum of 20 feet and a maximum of 60 feet.

The first step is to actuate ON-OFF switch 90 to the ON position thus energizing indicating light 92 by a circuit starting at a source 94 of 115-volt AC current and continuing through conductors 96,98, switch 90, conductor 100, bulb 92, conductors 102,104, switch 90, and conductors 106,108,110. The closing of ON-OFF switch 90 will also energize main power relay 112 at the back control panel 48 by completing a circuit starting at source 94 and including conductor 110, coil 114 of relay 112, conductors 116,118, switch 120 of low voltage relay 122, conductor 124, normally closed manual stop switch 126, conductor 128, switch 130 of console relay 132, conductors 134,136,100, ON-OFF switch 90 and conductors 98,96. The energizing of coil 114 of relay 112 will close normally open switch 138 of such relay.

The next step is to set the selector switch 140 to the desired setting. Assume for purposes of this description that a shooting distance of 45 feet is desired which means that switch 140 is set to position No. 6 to thus establish contact between contacts 142,144 and 146,148 of the switch. This is accomplished by selector switch arms 150 and 152 which are mounted on a common shaft (schematically indicated in dotted lines). It will be appreciated that at this point in the operation the stepper switch 154 will be in its reset condition with its contact 156 connected to dead contact 158 (position No. 1) by stepper switch arm 160.

The next step is to press the FROM button 162 which closes switch 164 which in turn will energize coil 166 of relay 168 on cart 14 by completing a circuit starting at source 94 and including: conductors 110,108,170, slip ring 172 and brush 174 of a conventional slip ring and brush arrangement located at the takeup drum 54 of takeup device 50, conductors 176,178,180 TO normally closed trip stop switch 182, conductor 184 FROM normally closed trip stop switch 186, conductor 188, normally closed safety switch 190, conductors 192,194, coil 166 of relay 168, conductors 196,198, FROM unidirectional safety switch 200, conductor 202, brush 204, slip ring 206, conductor 208, FROM switch 164, conductors 210,118, switch 120 of low voltage relay 122, conductor 124 STOP switch 126, conductor 128, switch 130 of console relay 132, conductors 134,136,100, ON-OFF switch 90, and conductors 98,96.

The energization of coil 166 of relay 168 will close normally open switches 212 and 214 of such relay. The closing of switch 214 will establish a holding circuit which in effect will short out FROM switch 164 from the circuit just described so that coil 166 will remain energized when FROM button 162 is released. Such holding circuit starting at source 94 includes: conductors 110,108,170, slip ring 172, brush 174, conductors 176,178,180, switch 182, conductor 184, switch 186, conductor 188, switch 190, conductors 192,194, coil 166, conductors 196,216, switch 214, conductors 218,220, thermal switch 222 (located at motor 30), conductor 224, brush 226, slip ring 228, conductors 230, switch 138 and conductors 232,96. The closing of switch 212 will energize motor starter coil 234 of motor 30 by completing a circuit from source 94 which includes: conductors 110,108,170, slipring 172, brush 174, conductors 176,236, switch 212 of relay 168, conductors 238,240,242,244, normally closed switch 246 of relay 248, conductor 250, motor starting coil 234, conductor 252, centrifugal starter switch 254, conductors 256,258, switch 260, conductors 262,264,268,270,272,196,216, switch 214, conductors 218,220, thermal switch 222, conductor 224, brush 226, slip ring 228, conductor 230, switch 138, and conductors 232,96. Simultaneously with the energization of starting coil 234 of motor 30, running coil 274 of the motor and coil 276 of brake 44 will also be energized. The energization of brake coil 276 will release normally set brake 44 and the energization of running coil 274 (by means of conductors 278,280) will cause motor 30 to drive cart 14 in the FROM direction down-range toward the desired stopping point. As the motor reaches its rated r.p.m. centrifugal starter switch 254 will open and thereby drop starter coil 234 in a conventional manner.

As the cart travels down-range, a normally open counting switch 282 mounted on the underside of cart 14 (see FIG. 4) will be actuated by a plurality of actuator members 284 (FIG. 1) mounted on track 12 at spaced intervals corresponding to the desired shooting distances. The first actuator member is located at the 20-foot distance (slightly up-range therefrom as will be explained). As counting switch 282 is momentarily closed as the cart passes thereby, a stepping coil 286 at console will be energized by a circuit starting at source 94 and including: conductors 110,108,170, slip ring 172, brush 174, conductors 176,178,288, counting switch 282, conductor 290, brush 292, slip ring 294, conductor 296, selector switch 140, conductor 298, stepper coil 286, conductors 300,302,136,100, ON-OFF switch 90, and conductors 98,96.

The momentary energization of stepping coil will cause stepper arm 160 of stepper switch 154 to advance from position No. 1 to position No. 2. Stepper switch 154 may be of any conventional design, the details of which are not a part of this invention. As cart 14 continues to travel down-range arm 160 will be advanced to positions 3, 4, 5 and 6 in the manner just described as counting switch 282 is momentarily closed by actuators 284 mounted on the track. As stepper switch 154 is actuated to position No. 7, the coil 304 of console relay 132 will be energized by a circuit starting at source 94 and including conductors 110,108,106, ON-OFF switch 90, conductors 104,102,306, coil 304 of relay 132, conductor 308, arm 152 of switch 140, conductor 310, arm 160 of switch 154, conductors 312,302,136,100, ON-OFF switch 90, and conductors 98,96.

The energization of coil 304 will open normally closed switch 130 of relay 132 which in turn will cause main power relay 112 and motor starter relay 168 to drop out. The opening of switches 212,214 of relay 168 will deenergize brake coil 276 which in turn will cause brake 44 on cart 14 to be set. The opening of switches 212,214 will also deenergize running coil 274 of motor 30. The setting of brake 44 will cause cart 14 to be stopped a predetermined distance (generally about 3—4 feet) beyond the actuate actuator 284 located at the 45-foot shooting distance. It should be noted at this point that upon energization of coil 304 of console relay 132 a circuit will be established to energize a stepper switch reset coil 314 by means of conductors 316,318,320, and a switch contact 322. The energization of reset coil 314 will cause arm 160 of stepper switch 154 to be returned to its No. 1 position. This in turn will break the circuit to coil 304 of relay 132 causing such relay to drop out. The resetting of switch 154 by coil 314 can be accomplished by any suitable means well known in the art such as by releasing a dog member from a ratchet wheel to allow arm 160 to return under the bias of a return spring. The deenergization of relay 132 will allow switch 130 to move back up to the position shown in the drawings. As previously explained, with switch 130 in such position and with ON-OFF switch closed, main power relay 112 will be energized.

With the cart positioned at the 45-foot distance, the archers proceed to shoot at the target 18 on the cart. When shooting is completed the cart can be returned to the front or TO position for removal of the arrows by simply pushing the TO button 324 on the console. With main power relay 112 energized, the actuating of TO button 324 will cause cart 14 to return in a manner which will now be described. Depressing TO button 324 will close switches 326 and 328 which, in turn, will energize coil 330 of relay 248 by a circuit starting at source 94 and including conductors 110,108,170, slip ring 172, brush 174, conductors 176,178,180, switch 182, conductor 184, switch 186, conductor 188, switch 190, conductors 192,332, coil 330 of relay 248, conductor 334 TO safety switch 336, conductor 338, brush 340, slip ring 342, conductor 344, switch 326, conductors 346,348,210,118, switch 120, conductor 124, switch 126, conductor 128, switch 130, conductors 134,136,100, switch 90, and conductors 98,96. The energization of coil 330 will open switches 246,260 and close switches 347,349,350. The closing of switch 350 will short TO switch 326 out of the circuit so that coil 330 will remain energized when TO button 324 is released.

The closing of TO switch 326 will also energize coil 166 of relay 168 to thereby close switches 212 and 214. Then with relays 168 and 248 both energized starter relay 234 and running relay 274 of motor 30 will be energized to start the motor in the TO direction and at the same time brake coil 276 will be energized to release the brake. Motor 30 will thus be energized to drive cart 14 in the TO direction. It will be noted at this point that when TO switch 328 is closed a circuit will be closed to energize reset coil 314 to thus insure that stepper switch 154 is reset to position No. 1 when the cart is driven in the TO direction.

Cart 14 will travel in the TO direction until TO trip stop switch 182 is opened by an elongated stop member 352 located at the front of the range as shown in FIG. 1. The opening of switch 182 will deenergize relays 168 and 248 and brake coil 276 causing cart 14 to stop. As indicated previously, cart 14 will coast a short distance before it comes to a complete stop usually about 3—4 feet after switch 182 is opened. TO safety switch 336 is positioned on cart 14 about 2 feet from switch 182 and stop bar 352 is dimensioned so that when cart 14 comes to rest switch 182 will have dropped off the end of stop bar 352 and switch 336 will be engaged thereby and thus held in open position. With switch 336 held in open position the cart cannot be driven in the TO direction by inadvertently pushing the TO button and with switch 182 closed the circuit for starting motor 30 in the FROM direction is in condition for starting the motor when FROM button 162 is depressed.

It should be noted at this point that stop bar 352 is made of sufficient length so that the interval between the opening of switch 182 and its subsequent closing (as it drops off the end of bar 352) is sufficient to permit the motor r.p.m. to slow down to the point where the centrifugal starter switch 254 will close before switch 182 drops off bar 352. This is important since if the interval is too short and if the operator inadvertently depresses the FROM button 162 at the time the stopping operation is being performed the running winding will be reenergized in the TO direction causing the cart to continue running in the TO direction. This will occur due to the fact that no change in polarity will be exerted on running coil by starter coil 234 as would normally occur if centrifugal switch 254 were allowed to close and then the circuits reenergized by closing FROM switch 164.

The arrangement for stopping the cart at the extreme FROM end of the range includes a stop bar 354 mounted at the FROM end of the track (FIG. 1). Bar 354 is adapted for actuating switches 186 and 200 in the sequence described above with respect to switches 182 and 336 to provide an identical stopping operation to that described above.

If for any reason the stop bar 352 and its associated switches 182,336 do not operate properly to stop the cart as described above, additional mechanism is provided to prevent the cart from running off the front end of the range. Such additional mechanism is comprised of a pair of elongated cam members 356,356 mounted on the floor at the front of the range as shown in FIGS. 1 and 2. Cams 356,356 are mounted in alignment with the outer edges of cart body 20 and adapted for engagement with a pair of skid members 358,360 mounted on the underside of the cart body with the front skid 358 being of slightly less depth as the rear skid 360, as shown in FIG. 2. Cam members 356 are provided with a lower level portion 362 and an upper level portion 364 adapted for cooperation with pairs of skid members 358,360, respectively. Thus, if cart 14 is not stopped by bar 352 it will ride up on cam members 364 causing the wheels 22 of the cart to be lifted off the floor. With wheels 22 lifted off the floor the cart will stop due to the absence of driving traction between the wheels and the floor.

As a further safety precaution, a safety stop switch 190 is provided on the cart which will be held closed as long as the cart remains on the track. If, however, the cart should jump the track for any reason, switch 190 will open causing motor 30 to be stopped. Safety stop switch 190 will open, of course, if cart 14 rides up on cam members 364 as described above.

Another safety feature of this invention is the provision of a normally open foot pad switch 366 (FIG. 15) adapted for actuation by a foot pad member 368 positioned at the front of the range as shown in FIG. 1. As shown in the circuit diagram of FIG. 15 when foot pad switch 366 is closed a bell 370 will ring by power supplied by a low voltage transformer 372. Thus, if, for any reason, a person should step over the foul line at the front of the range onto foot pad 368, the warning bell 370 will ring. When, however, the cart is brought to its extreme TO position at the front of the range for removal of the arrows from the target a normally closed track cancel switch 374 (FIG. 15) will be opened to thereby prevent bell 370 from ringing when the archer steps onto pad 368 to remove the arrows from the target. Track cancel switch 374 is not shown in FIG. 1 but it can be positioned in any suitable position at the front of the range where it will be opened by the cart when the cart reaches the front of the range. Switch 374 will return to its normally closed position when the cart is driven downrange from the extreme TO position.

Although but one embodiment of the present invention has been illustrated and described, it will be apparent to those skilled in the art that various changes and modifications may be made therein without departing from the spirit of the invention or from the scope of the appended claims.

I claim:

1. Target return apparatus for a shooting range comprising:
 a wheeled cart mounted for rolling movement along the range and adapted to carry a target thereon;
 a drive motor means adapted to drive said cart back and forth along the range; and
 a control means for said drive motor means adapted to automatically stop said cart at one end of the range, said control means including a stop switch means mounted on said cart and a stop switch actuating means mounted on said one end of the range, said stop switch actuating means adapted to actuate said stop switch means to stop said cart means at said one end of the range, said stop switch means including first and second switch means mounted on said cart, said stop switch actuating means adapted to actuate said first switch means as said cart approaches said one end of the range, said first switch means adapted when actuated to deenergize said drive motor means allowing said cart to coast to a stop, said stop switch actuating means further adapted to allow said first switch means to return to its unactuated condition when said cart comes to a complete stop to thereby place said control means in condition for energization of said drive motor to drive said cart toward the other end of the range, said stop switch actuating means further adapted to actuate said second switch means when the cart comes to a complete stop at said one end of the range, said second switch means adapted when actuated to place said control means in a condition whereby said drive motor means cannot be energized to drive the cart in any direction except towards the other end of the range.

2. Target return apparatus according to claim 1 in which said control means further includes a warning means a foot pad member located at the front of the range and a foot pad switch means adapted for actuation when pressure is applied to said foot pad member, said foot pad switch means adapted to energize said warning means when actuated by said foot pad member.

3. Target return apparatus for a shooting range comprising:
 a wheeled cart having pairs of front and rear wheels mounted for rolling movement along the range and adapted to carry a target thereon;
 a drive motor means adapted to drive said cart back and forth along the range; and
 a control means for said drive motor means, said control means including a stop-switch means mounted on said cart and a stop-switch actuating means mounted on opposite ends of the range, said stop-switch actuating means adapted to actuate said stop-switch means to stop said cart at opposite ends of the range, said control means further including a safety stop means mounted at the front of the range, said safety stop means including a pair of stationary cam members adapted for engagement by the underside portion of said cart between said wheels causing the front wheels of the cart to be lifted free of the range so they can rotate freely out of contact with any supporting surface.